(12) United States Patent
Bernstein et al.

(10) Patent No.: US 8,032,591 B2
(45) Date of Patent: *Oct. 4, 2011

(54) SYSTEMS AND METHODS FOR MAPPING EVENT CHANGES IN NETWORK NAVIGATION

(75) Inventors: Steven M Bernstein, Cupertino, CA (US); David R Friedman, San Jose, CA (US)

(73) Assignee: eBay, Inc., San Jose, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/145,934

(22) Filed: Jun. 25, 2008

(65) Prior Publication Data

US 2009/0327424 A1 Dec. 31, 2009

(51) Int. Cl.
*G06F 15/16* (2006.01)

(52) U.S. Cl. ........ 709/204; 709/207; 709/224; 709/250; 709/223; 370/506; 370/351

(58) Field of Classification Search ................... 709/207, 709/224, 250, 223, 204; 370/506, 614, 351
See application file for complete search history.

(56) References Cited

U.S. PATENT DOCUMENTS

| | | | |
|---|---|---|---|
| 2004/0059746 A1* | 3/2004 | Error et al. | 707/102 |
| 2005/0257400 A1* | 11/2005 | Sommerer et al. | 36/13 |
| 2006/0277212 A1* | 12/2006 | Error | 707/102 |
| 2008/0201357 A1* | 8/2008 | Error et al. | 707/102 |

* cited by examiner

*Primary Examiner* — Wing Chan
*Assistant Examiner* — Hitesh Patel
(74) *Attorney, Agent, or Firm* — Haynes and Boone, LLP

(57) ABSTRACT

In accordance with one or more embodiments of the present disclosure, systems and methods for mapping user experiences over a network include obtaining path data related to a first sequence of user navigation events, obtaining path data related to a second sequence of user navigation events that is at least different than the first sequence of user navigation events, comparing path data of the first and second sequences of user navigation events, identifying changes to the path data, and generating a map of the user navigation events based on the identified changes to the path data.

25 Claims, 8 Drawing Sheets

Eddy Mapping Network Diagram

SYSTEMS AND METHODS FOR MAPPING EVENT CHANGES IN NETWORK NAVIGATION

CROSS-REFERENCE TO RELATED APPLICATIONS

This application is related to Ser. No. 12/145,865, entitled "SYSTEMS AND METHODS FOR MAPPING USER EXPERIENCES IN NETWORK NAVIGATION", filed Jun. 25, 2008, which is incorporated herein by reference in its entirety.

BACKGROUND

1. Technical Field

The present invention generally relates to mapping user experiences over a network and more particularly to mapping event changes in network navigation.

2. Related Art

In many online environments, a user navigates through selectable pages of service provider sites to view information resources, execute sales transactions, and/or communicate with other users. The service provider benefits from efficiently organizing links between pages and other sites to improve user experiences. However, the service provider may need to periodically update the site, which may change the user's experiences. In view of these changes, analysis may indicate the need for improved navigation.

In the past, it has been difficult to study the affect of navigational changes to sites in reference to some user experiences. For example, deleting and adding pages can generate large amounts of data that may be difficult to track and analyze. Thus, there is a need for easily visualizing aggregated site traffic patterns after updates have been implemented that efficiently reflect changes in user navigational patterns.

SUMMARY

Systems and methods disclosed herein, in accordance with one or more embodiments, map user experiences over a network, such as the Internet, by providing directed graphs of network diagrams that indicate network nodes and directional links between network nodes for network optimization analysis. In various implementations, mapping user experiences refers to generating one or more visual representations of network traffic data relevant to tracking website usage. This enables a clear and simple analysis of website usage patterns for purposes of streamlining and optimizing website operation.

In accordance with an embodiment of the present disclosure, a system for mapping user experiences over a network includes a first component adapted to communicate with a user via a client device over the network and a second component adapted to track user navigation events of the user over the network, obtain path data related to a plurality of sequences of the user navigation events, identify changes to the path data, and generate a map of the user navigation events based on the identified changes to the path data.

In various implementations, the plurality of sequences of user navigation events includes a first sequence of user navigation events and a second sequence of user navigation events that is at least different than the first sequence of user navigation events. The second component is adapted to compare the path data of the first and second sequences of user navigation events. The second component may be adapted to identify changes to the path data based on the comparison and generate a map of the user navigation events based on the identified changes to the compared path data. The second component may be adapted to maintain a user sequence log that tracks the user navigation events over the network.

In various implementations, the system may include a storage component adapted to store at least one of the user navigation events over the network, the path data, the changes to the path data, and the map of the user navigation events. The system may include a display component adapted to display at least one of the user navigation events over the network, the path data, the changes to the path data, and the map of the user navigation events. In one aspect, the map includes visual path data of the user navigation events.

In various implementations, the first component may be adapted to communicate with a resource provider via a resource device over the network, and the second component may be adapted to track user navigation events of the user over the network via the resource provider. The second component may be adapted to track the user navigation events of the user through a network site of the resource provider. The resource provider may include an information resource provider and/or a marketplace provider. The resource device may include a resource server adapted to communicate with the client device and the second component via the network. The client device may include a browser application adapted to allow the user to access the resource device via the network and navigate through a plurality of resource pages made available on a network site by the resource provider.

In accordance with an embodiment of the present disclosure, a method for mapping user experiences over a network includes obtaining path data related to a first sequence of user navigation events, obtaining path data related to a second sequence of user navigation events that is at least different than the first sequence of user navigation events, comparing path data of the first and second sequences of user navigation events, identifying changes to the path data, and generating a map of the user navigation events based on the identified changes to the path data.

In various implementations, the method may include tracking user navigation events on the network by communicating with at least one of a user via a client device over the network and a resource provider via a resource device over the network. The method may include obtaining path data comprises communicating with at least one of a user via a client device over the network and a resource provider via a resource device over the network.

These and other features and advantages of the present disclosure will be more readily apparent from the detailed description of the embodiments set forth below taken in conjunction with the accompanying drawings.

Figure 1:
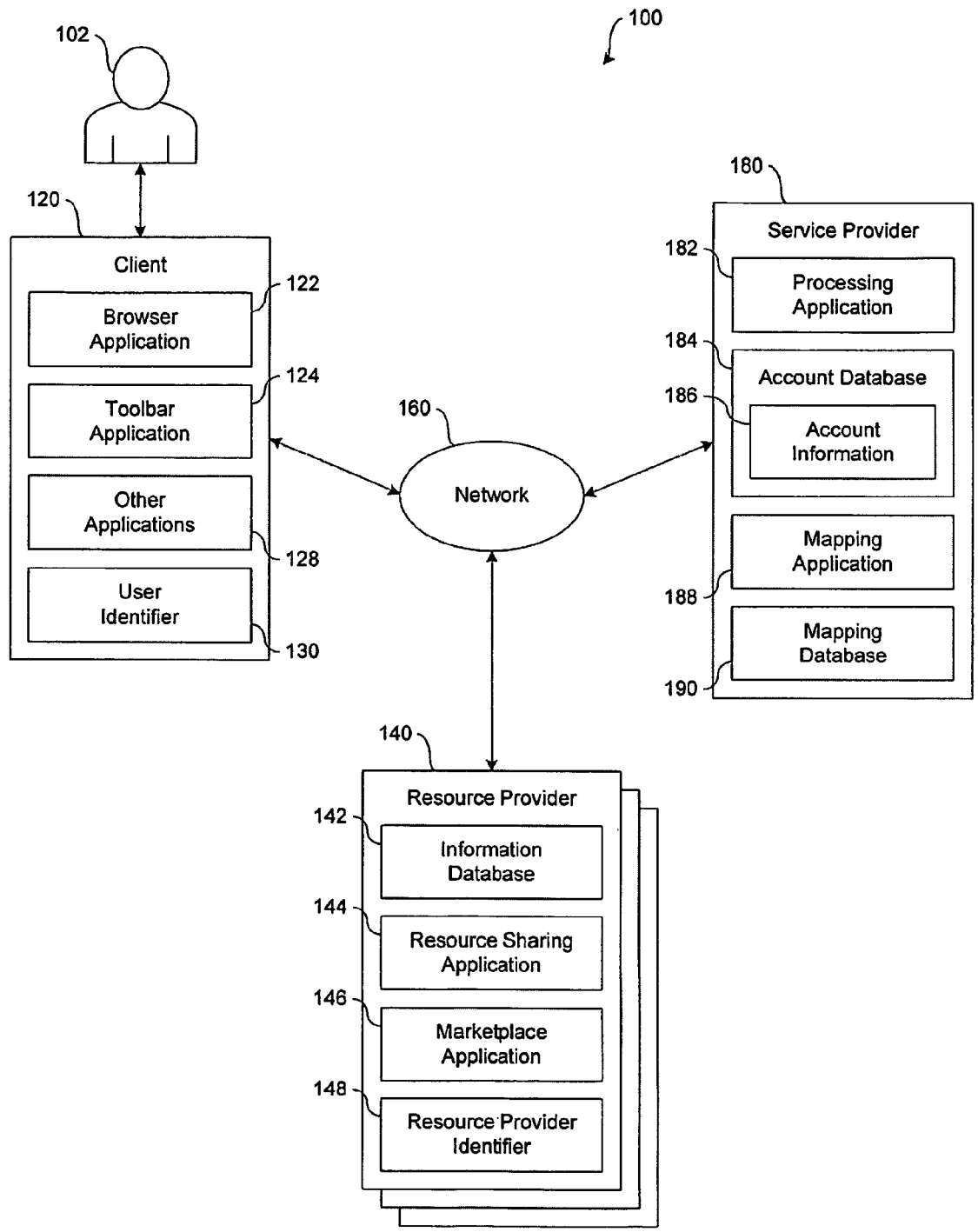
FIG. 1 shows a block diagram of a system for mapping user experiences over a network, in accordance with an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure relates to visual representation of network data relevant to tracking website usage, which enables analysis of website usage patterns for purposes of streamlining and optimizing website network operation. In various embodiments, the network refers to a website network of pages and/or objects that a user navigates through to generate website usage patterns. In some embodiments, Internet traffic may be mapped.

In one implementation, repeated or recurring visits to a particular webpage are identified to simplify network traffic visualization. These repeated visits are referred to, in singular, as an eddy or, in plural, as eddies. As such, eddy mapping refers to generating a network traffic visualization in form of a graph (e.g., a directed graph) that may be easily viewed by a user. In accordance with one or more embodiments of the present disclosure, eddy mapping is disclosed in greater detail herein with reference to the drawings.

In another implementation, the sequence of network traffic on a particular website may change over time based on re-routing of network nodes and/or deleting or adding network nodes. As such, changes to network traffic flow may affect a user's experience on the particular website. Therefore, delta mapping refers to comparing network traffic visualizations between separate events, such as before and after changes to the sequence of network traffic flow. In accordance with one or more embodiments of the present disclosure, delta mapping is disclosed in greater detail herein with reference to the drawings.

FIG. 1 shows one embodiment of a block diagram of a system 100 adapted to facilitate mapping of user experiences over a network 160. As shown in FIG. 1, the system 100 includes at least one client device 120, one or more resource provider servers 140, and at least one service provider server 180 in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

The client device 120, in one embodiment, may be implemented using any appropriate combination of hardware and/or software configured for wired and/or wireless communication over the network 160. For example, the client device 120 may be implemented as a personal computer of a user 102 (e.g., a client or customer) in communication with the network 160, such as the Internet. In other examples, the client device 120 may be implemented as a wireless telephone (e.g., cell phone), personal digital assistant (PDA), notebook computer, and/or various other generally known types of wired and/or wireless computing devices. It should be appreciated that, in various embodiments, the client device 120 may be referred to as a user device or a customer device without departing from the scope of the present disclosure.

The client device 120, in one embodiment, may include one or more browser applications 122 which may be used to provide a user interface to permit the user 102 to browse information available over the network 160. For example, the browser application 122 may be implemented as a web browser to view information available over the network 160, such as the Internet. In one implementation, the browser application 122 comprises a software program, such as a graphical user interface (GUI), executable by a processor that is configured to interface and communicate with the one or more resource provider servers 140 and the service provider server 180 via the network 160. For example, the user 102 is able to access resource provider websites via resource provider servers 140 to view and select items for purchase, and the user 102 is able to purchase selected items from resource providers 140 by communicating with the service provider server 180. As described in greater detail herein, when accessing a resource provider site as provided by at least one of the resource provider servers 140, the user 102 may click through a sequence of visual events that may be tracked and logged as network traffic data and stored by the service provider 180 for analysis. Embodiments of the present disclosure provide a way for the service provider server 180 to generate a network traffic visualization of the user's visual experience.

The client device 120, in one embodiment, may include one or more toolbar applications 124, which may be used to provide client-side processing for performing tasks in response to operations selected by the user 102. For example, the toolbar application 124 may display a GUI in connection with the browser application 122.

The client device 120, in one embodiment, may include other applications 128 as may be desired in one or more embodiments to provide additional features available to the user 102. In one example, such other applications 128 may include security applications for implementing client-side security features, programmatic client applications for interfacing with appropriate application programming interfaces (APIs) over the network 160 or various other types of generally known programs and/or applications.

The client device 120, in one embodiment, may include one or more user identifiers 130, which may be implemented as operating system registry entries, cookies associated with the browser application 122, identifiers associated with hardware of the client device 120, and/or various other appropriate identifiers. The user identifier 130 may include attributes related to the user 102, such as personal information (e.g., a user name, password, photograph image, biometric id, address, social security number, phone number, email address, etc.) and banking information (e.g., banking institution, credit card issuer, user account numbers, security information, etc.). In various implementations, the user identifier 130 may be passed with a user's network traffic data to the service provider server 180, and the user identifier 130 may be used by the service provider server 180 to associate the user 102 with a particular user account maintained by the service provider server 180.

The one or more resource provider servers 140, in various embodiments, may be maintained by one or more information resource providers offering various types of information for viewing and sharing over the network 160. In this regard, each of the one or more resource provider servers 140 may include an information database 142 for storing and archiving searchable information, which may be made available to the client device 120 for viewing and sharing by the user 102. In one implementation, each of the resource provider servers 140 may include a resource sharing application 144, which may be configured to provide information to the user 102 over the network 160. For example, the user 102 may interact with the resource sharing application 144 through the browser application 122 of the client device 120 to search and view various types of information made available to the user 102 from the database 142 of the resource provider server 140.

In various other embodiments, the one or more resource provider servers 140 may be maintained by one or more merchants offering various items, such as products and/or services, for purchase in exchange for financial payment to be received from users, such as the user 102, over the network 160. In this regard, each of the one or more resource provider servers 140 may include the database 142 for identifying available products and/or services, which may be made available to the client device 120 for viewing and purchase by the user 102. Accordingly, each of the resource provider servers 140 may include a marketplace application 146, which may be configured to provide information over the network 160 to the browser application 122 of the client device 120. For example, the user 102 may interact with the marketplace application 146 through the browser application 122 of the client device 120 to search and view various items, products and/or services identified in the information database 142 of the server 140. The marketplace application 146 may include a checkout application, which may be configured to facilitate online purchase transactions by the user 102 of products and/or services identified by in the database 142. In this regard, the marketplace application 146 may be configured to accept payment information from the user 102 and/or from service provider server 180 over the network 160.

Each of the one or more resource provider servers 140, in one embodiment, may include one or more resource provider identifiers 148, which may be included as part of the one or more items made available for purchase so that particular items are associated with particular resource providers. The resource provider identifier 148 may include attributes related to the resource provider, such as business and banking information. In various implementations, the resource provider identifier 148 may be passed with a user purchase request to the service provider server 180 when the user 102 selects an item for purchase, and the resource provider identifier 148 may be used by the service provider server 180 to associate a particular item purchased with a particular resource provider account maintained by the service provider server 180.

In one embodiment, each of the one or more resource providers having a related resource provider server 140 may need to establish a resource provider account with the service provider server 180 so that the payment server provider 180 is able to process transactions having items offered for purchase by the resource providers. When establishing a resource provider account, each of the one or more resource providers may need to provide business information, such as first name, last name, address, social security number, date of birth, phone number, email address, etc., and financial information, such as banking information, resource provider account information, credit card information, payment processing information, etc.

In various embodiments, as discussed herein, each of resource provider servers 140 may be associated with a particular link (e.g., a link, such as a URL (Uniform Resource Locator) to an IP (Internet Protocol) address). In this regard, the service provider server 180 may optionally redirect the browser application 122 of the client device 120 to an appropriate webpage and/or resource provider site of the resource provider server 140 to facilitate information transactions and marketplace transactions from at least one of the resource provider servers 140.

The service provider server 180, in one embodiment, may be maintained by an online service provider, which may provide payment processing for online financial and information transactions on behalf of the user 102 to an operator of the resource provider server 140. As such, the service provider server 180 includes at least one processing application 182, which may be adapted to interact with the client device 120 and/or each of the resource provider servers 140 over the network 160 to facilitate information sharing over the network 160, facilitate mapping user experiences over the network 160, and/or facilitate purchases from the resource provider servers 140 over the network 160. In one example, the service provider server 180 may be provided by PayPal, Inc. of San Jose, Calif., USA.

The service provider server 180, in one embodiment, may be configured to maintain a plurality of user and resource provider accounts in an account database 184, each of which may include account information 186 associated with individual users, including the user 102, and the one or more resource providers associated with the resource provider servers 140. For example, account information 186 may include private financial information of the user 102 and resource providers 140, such as one or more account numbers, passwords, credit card information, banking information, or other types of financial information, which may be used to facilitate online transactions between the user 102 of the client device 120 and one or more resource providers associated with the resource provider servers 140.

As such, in one implementation, the processing application 182 may be configured to interact with the one or more resource provider servers 140 on behalf of the user 102 during a transaction with marketplace application 146 without requiring the user 102 to provide account information 186 directly to the resource provider server 180. In various aspects, it should be appreciated that the methods and systems described herein may be modified to accommodate users and/or resource providers that may or may not be associated with at least one existing user account and/or resource provider account, respectively.

The service provider server 180, in one embodiment, may include a content database 190 for storing and tracking information related to transactions between particular users, such as the user 102, and one or more particular resource providers 140. The content database may provide a historical account of user experiences of the user 102 including historical accounts of information transaction and marketplace transactions between the user 102 and each of the resource provider servers 140. Accordingly, in one implementation, the service provider server 180 may include a content processing application 188 that may be configured to track, log, and store transaction information, including mapping user experiences, and provide this information to the processing application 182 of the service provider 180 for analysis. As such, the service provider 180 may search and view the mapping history of network traffic flow of multiple users, including the user 102, in reference to particular resource providers identified in the content database 190.

Figure 2:
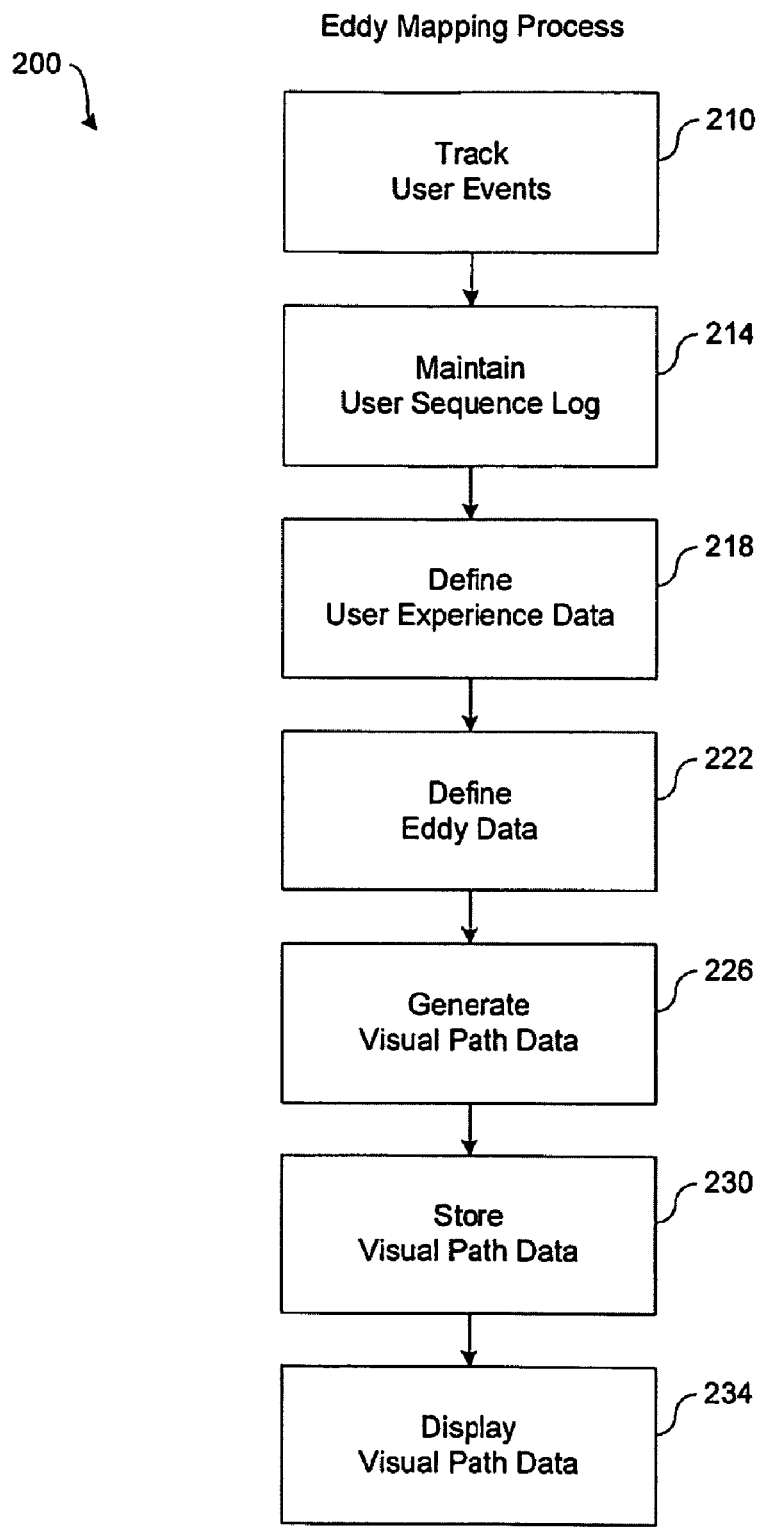
FIG. 2 shows a block diagram of an eddy mapping process, in accordance with an embodiment of the present disclosure.

FIG. 2 shows one embodiment of a method 200 for tracking user experiences on the network 160 with eddy mapping. In one implementation, the user 102 may run the browser application 122 on the client device 120 to access at least one resource provider site via a related resource provider server 140 to search and view any available information. Access to the resource provider site may be made available to the user 102 by the service provider 180, wherein the service provider 180 uses the processing application 182 to track and log the user's click-event experiences on the resource provider site.

Referring to FIG. 2, the method 200 involves tracking user click-events (block 210) on the accessed site. This may involve accessing a plurality of linked pages available at the resource provider site. Next, a user click-event sequence log is maintained (block 214). This may involve documenting and storing the user's experience path through the site as navigated by the user 102. Next, user experience data is defined (block 218). This may involve generating data relevant to the user's click-event experience for use with a network traffic visualization application or tool. Next, eddy data is defined (block 222). This may involve identifying one or more eddies (i.e., repetitive accesses to particular pages) in the user experience data (block 226). Next, once the one or more eddies are defined or at least identified, visual path is generated (block 226). This may involve generating a visual representation of the user's click-event experience of the site based on the user experience data and eddy data. Next, the visual path data may be stored, for example, in a memory component (block 230) and/or displayed, for example, as a graph on a display component, such as a monitor (block 234) for viewing and/or analysis by an operator.

Figure 3A:
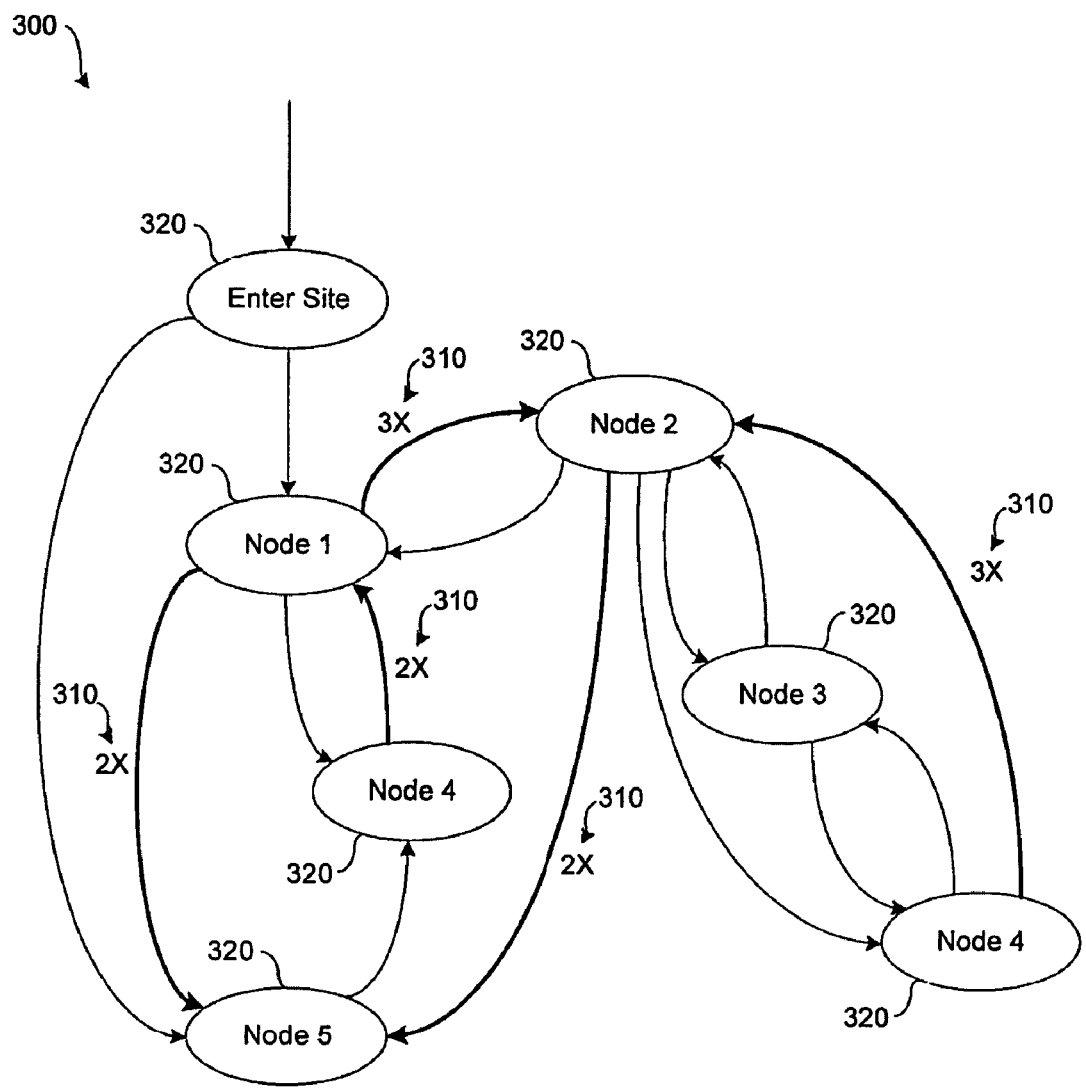
FIG. 3A shows a block diagram of an eddy mapped network, in accordance with an embodiment of the present disclosure.

FIG. 3A shows a block diagram of an eddy mapped network 300, in accordance with an embodiment of the present disclosure. As shown in FIG. 3A, eddies 310 in the visual representation may occur when a user repeatedly visits nodes 320 in a particular web page (e.g., a portal page, home page, profile page, etc.). As shown in FIG. 3A, links or paths between nodes 320 may be indicated as eddies 320 with some number of N× access times (e.g., 2×, 3×, etc.). These eddy labels indicate click streams with N returns to the target page or node, as shown. In some cases, eddies 310 are expected, but in other cases eddies 310 may be unexpected or undesirable. For example, a website provider (e.g., resource provider 140 or service provider 180) may decrease the incidence of eddies 310 in the course of particular webpage sequences (e.g., payment flow). Some methods of visual representation of full path data tend to depict sequences linearly, which makes perceiving eddies difficult without further analysis. The method 200 provides an efficient way of visually representing eddies 310 in a visual representation, such as a graph of the eddy mapped network 300. In various implementations, visually representing eddies 310 may be accomplished by using different colors, labels, graphics (e.g., dashed lines), or line thicknesses in representation of the paths between nodes 320.

Figure 3B:
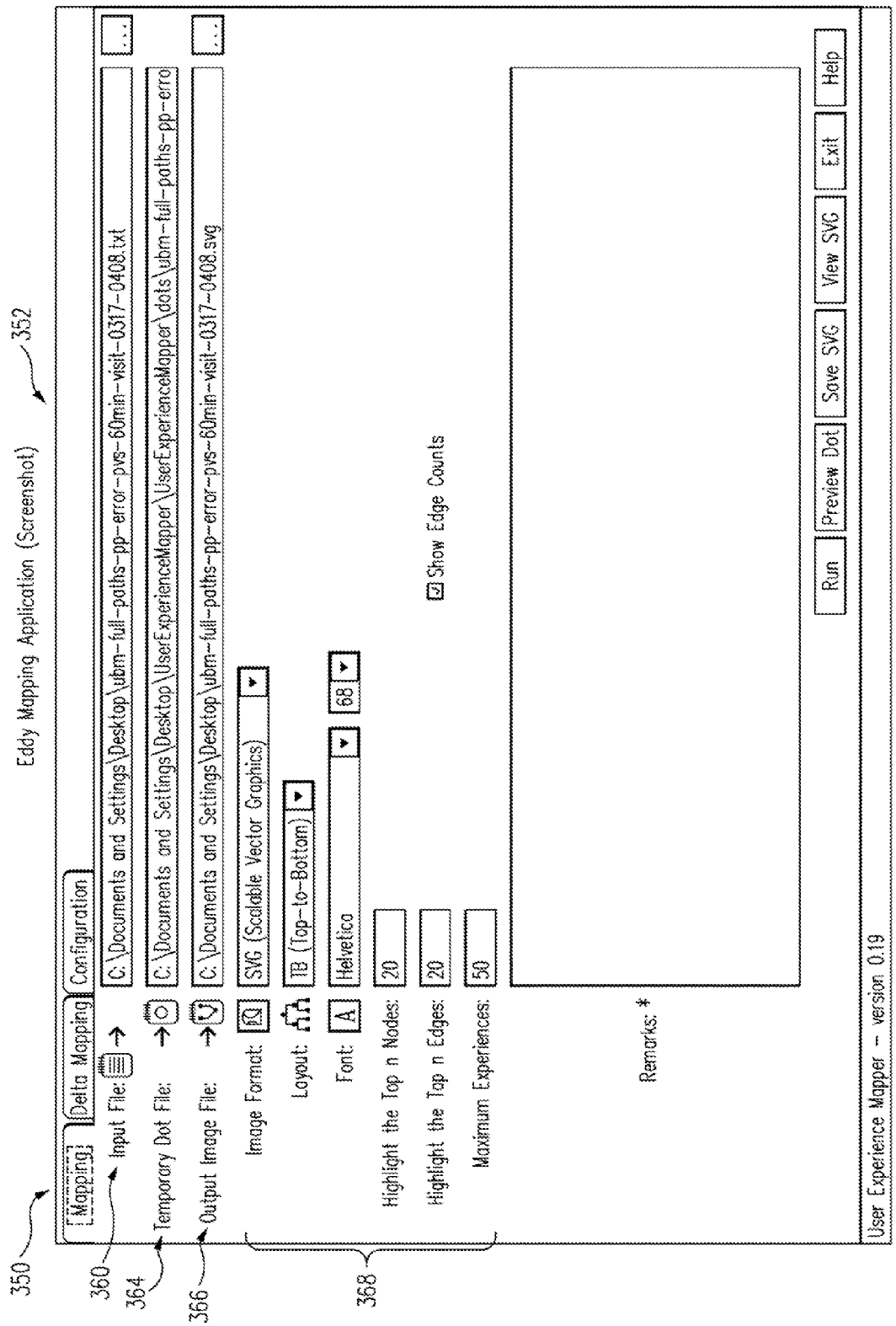
FIG. 3B shows a screenshot of an eddy mapping application, in accordance with an embodiment of the present disclosure.

FIG. 3B shows a screenshot of an eddy mapping application 350, in accordance with an embodiment of the present disclosure. The eddy mapping application 350 includes one or more fields 352 for entry of eddy mapping parameters.

In one implementation, the eddy mapping application 350 receives input data. For example, at least one input file 360 includes data for at least one website user experience (e.g., sequence of events) and a count of site visitors with similar user experiences. In one implementation, the input file comprises a text file (e.g., a Comma Separated Values (CSV) file) for keeping tabular data (e.g., tabular data with lines=rows=records) and columnar data in a given row delimited with commas. It should be appreciated by those skilled in the art that various other types of text files and/or data files may be used and other types of text or punctuation may be used for delimiting, such as colons, semi-colons, dashes, etc., without departing from the scope of the present disclosure.

Next, the eddy mapping application 350 processes the input data. For example, input data from the at least one input file 360 is processed to produce at least one data file 364, which may include a DOT file, a temporary DOT file, etc., for storage in a file system for later use to produce a visual depiction, such as an output image file 366 of a directed graph. In various implementations, the at least one data file 364 comprises an object relation mapping file to hold directed graphs, which may be referred to as a publicly described text file for describing network flow data as directed or undirected graphs that may be used as an input by graph (e.g., math definition of graph) visualization software. In one embodiment, the eddy mapping application 350 includes a module to identify and capture one or more eddies (i.e., multiple visits to the same page within a single session, such as a single instance of a given experience) with the last return visit to that page in that experience coming from the same source page. It should be appreciated by those skilled in the art that various other types of data files may be used, without departing from the scope of the present disclosure.

Next, the eddy mapping application 350 generates a visual representation, such as the output image file 366 for the directed graph, to visually depict the user's experience. For example, the data file 364 is read from memory storage by the eddy mapping application 350 to visually depict the user's experience for analysis by an operator. In various implementations, various image format and layout parameters 368 may be selected and configured for the output image file 366.

In various implementations, the method 200 involves tracking website usage by tracking the sequence of web pages in the website that each visitor to the website click-events on a particular visit and maintaining a log of every such discrete visitor click-event sequence. Each particular sequence of click-events by the user 102 may be denoted as a full path sequence. Tracking website usage on a full path basis assists a website owner, such as resource provider 140 or service provider 180, to understand a user's experience on each visit to the website. Because an enormous amount of full path data may be generated and collected, it may be difficult to analyze. Accordingly, compiling this raw data in visual form for purposes of analysis is helpful when using a visualization application or tool.

In one embodiment, the method 200 of FIG. 2 provides a way to represent aggregate network traffic in a graph or map of the network 160. The method 200 may be adapted to represent a plurality of webpages of a website as labeled nodes, represent a navigation path between webpages by a labeled indicator (e.g., directed arrow or line), associate with each webpage a count of visits by users (e.g., the user 102) in selected intervals, and associate with the navigation path, a count of user navigation click-events between webpages by users in the selected intervals. The method 200 may be adapted to represent the webpage visit count as a number presented in association with the webpage, and/or represent the navigation path count as a number presented in association with the labeled directed arrow or line. In various implementations, as shown in FIG. 3A, recurring webpage accesses (e.g., eddies) by users may be represented by different visual appearances, such as color, line thickness, line pattern, directed lines, and/or directed arrows.

Figure 4:
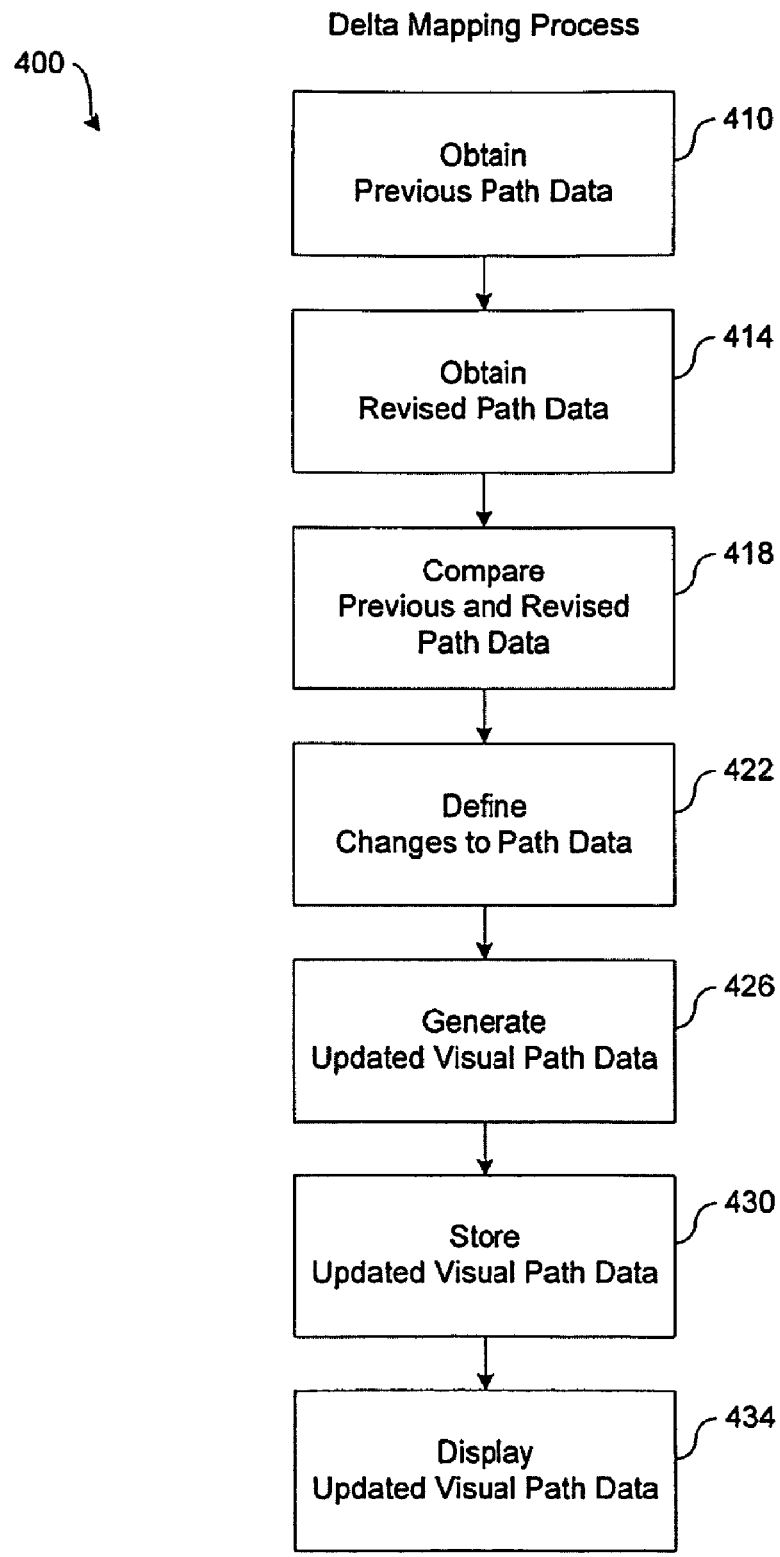
FIG. 4 shows a block diagram of a delta mapping process, in accordance with an embodiment of the present disclosure.

FIG. 4 shows one embodiment of a method 400 for tracking user experiences on the network 160 with delta mapping. In one implementation, the sequence of network traffic between nodes on a particular site may be re-routed, deleted or added. As such, since changes to network traffic flow may affect the user's experience on the site, delta mapping compares network traffic visualizations between separate events, such as before and after changes to the sequence of network traffic flow.

The method 400 involves obtaining previous visual path data of a user's previous click-event experiences (block 410) on the accessed site. This may involve accessing previously generated visual path data. Next, once the site links of the particular site have been altered, revised visual path data is obtained (block 414). This may involve accessing generated visual path data of the altered site. Next, the previous visual path data and the revised path data are compared (block 418), and changes to the path data are defined (block 422). This may involve subtracting the previous visual path data from the revised path data to identify changes to the path data as experienced by the user 102. Next, once the changes are defined or at least identified, updated visual path is generated (block 426). This may involve generating an updated visual representation of the user's click-event experience of the site based on changes to the user experience data. Next, the updated visual path data may be stored, for example, in a memory component (block 430) and/or displayed, for example, as a graph on a display component, such as a monitor (block 434) for viewing and/or analysis by an operator.

In reference to tracking website usage pattern changes after a revision, problem may occur when trying to visually represent visual path data that has been collected before and after a tracked website undergoes a significant revision or redesign. Because webpages may be added or deleted from a website as a result of a revision, visual path data spanning a website revision may include many webpage sequences that involve webpages that are no longer accessible or involve webpages added after a revision. A simple visual representation of visual path data that depicts all sequences of webpage click-events may confuse the user 102 and be less useful because it may not be apparent in the visual representation which webpages have been deleted or newly added, and therefore it may not accurately depict website usage patterns. To overcome these problems, delta mapping provides a way to update visual path data before a website revision so that the visual representation of this data readily indicates what webpage changes have been made. Delta mapping allows the viewer of the visual representation of delta-mapped visual path data to quickly view large scale changes in website usage patterns to facilitate the optimization of the website. In one implementation, delta mapping may include a "normalization" of delta-mapped data, or factoring out overall increases in website traffic from visual path data collected at more than one different points in time, so that actual changes in website usage patterns of specific webpages may be viewed without distortion by increases in traffic on the website.

In various implementations, in addition to depicting changes over time, delta mapping may be used to show differences in traffic patterns between different classes and/or segments of users during the same time period. As such, "normalization" may refer to the sizes of the two groups being compared, which may be different.

Figure 5A:
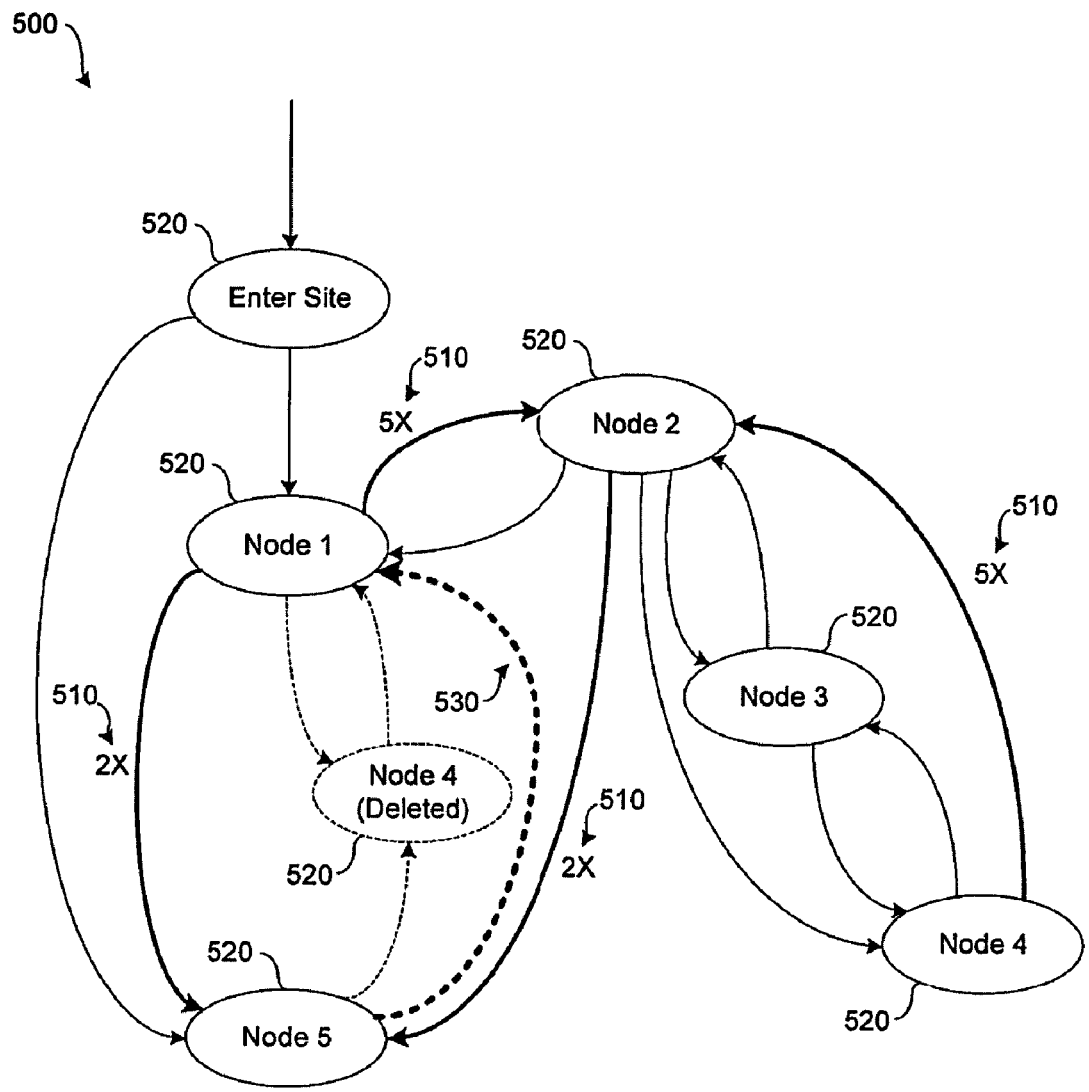
FIG. 5A shows a block diagram of a delta mapped network, in accordance with an embodiment of the present disclosure.

FIG. 5A shows a block diagram of a delta mapped network 500, in accordance with an embodiment of the present disclosure. The delta mapped network 500 shows changes in network traffic between one period and another period. Due to network path changes, some traffic may increase, some traffic may decrease, and some paths between nodes 520 may be newly generated. In one example, as shown in FIG. 5A, a node 520 (e.g., node 4) may be deleted in a revised visual representation. Accordingly, links or paths that no longer exist to and from a deleted node (e.g., node 4) may be visually represented differently, such as a skinny dashed line, and a new path or link 530 between nodes 1 and 5 may be shown in a thick dashed line. As such, these delta labels indicate new click streams between target pages or nodes. In one aspect, eddies 510 between links or nodes may be shown, and these eddies 510 may occur at the new links or paths between nodes 520. The method 400 provides an efficient way of visually representing delta changes in a visual representation, such as a graph of the delta mapped network 500. In various implementations, visually representing delta changes may be accomplished by using different colors, labels, graphics (e.g., dashed lines), or line thicknesses in representation of the paths between nodes 520.

Figure 5B:
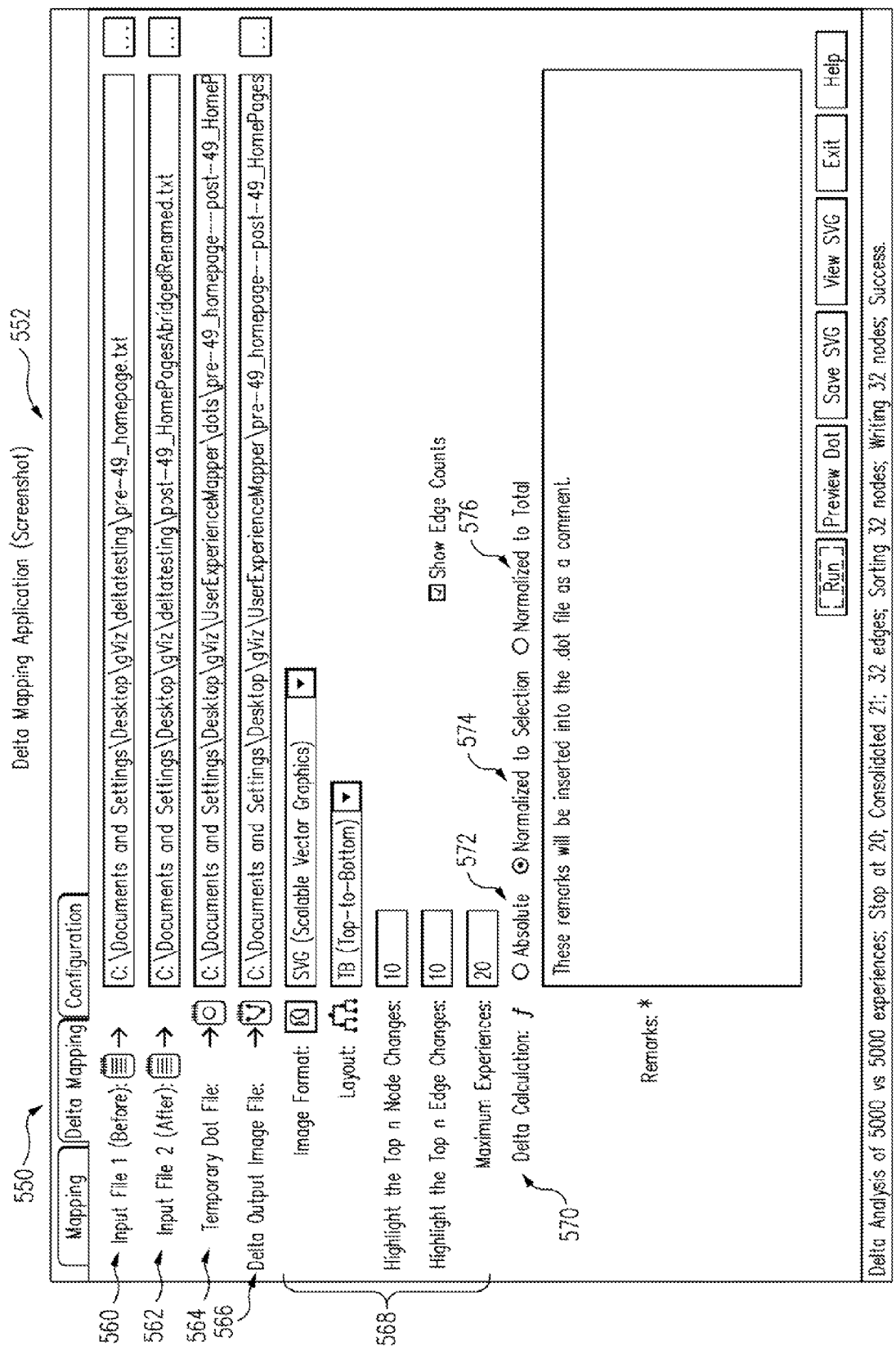
FIG. 5B shows a screenshot of a delta mapping application, in accordance with an embodiment of the present disclosure.

FIG. 5B shows a screenshot of a delta mapping application 550, in accordance with an embodiment of the present disclosure. The delta mapping application 550 includes one or more fields 552 for entry of delta mapping parameters.

In one implementation, the delta mapping application 550 receives input data. For example, at least two input files 560, 562 may be named and include data for each website user experience (e.g., sequence of events) and a count of site visitors with similar user experiences. As previously described in reference to FIG. 3B, the input files 560, 562 may comprise text files (e.g., CSV files) for keeping tabular data and columnar data. It should be appreciated by those skilled in the art that various other types of text files and/or data files may be used, without departing from the scope of the present disclosure.

Next, the delta mapping application 550 processes the input data. For example, input data from the at least two input files 560, 562 is processed to produce a single data file 564, which may include a single DOT file, a single temporary DOT file, etc., for storage in a file system for later use to produce a visual depiction, such as delta output image file 566 of a directed graph, showing differences in site traffic patterns from one period or group of visitors to the another period or group of visitors.

In one implementation, one input file 560 is subtracted from the other input file 562, in the sense that changes in quantity of traffic between two events is compared and captured in a single visual representation 564. In a delta calculation 570, changes in quantity may be captured as absolute changes 572, normalized changes to a particular selection 574, or normalized changes relative to overall traffic 576.

Next, the delta mapping application 550 generates the delta output image file 566 of the visual representation, such as the directed graph, to visually depict the user's experience, as revised during processing. For example, the single data file 564 is read from memory storage by the delta mapping application 550 to visually depict the user's experience for analysis by an operator. In various implementations, various image format and layout parameters 568 may be selected and configured for the delta output image file 566.

In one embodiment, the method 400 of FIG. 4 provides a way to represent aggregate changes in network traffic in the form of a graph or map of the network 160. The method 400 may be adapted to indicate changes in navigation of a website, represent the changes by different visual appearances, represent changed navigation paths between webpages with various types of indicators (e.g., a labeled directed arrow or line of a different appearance than the navigation path representation before the changing), The method 400 may be adapted to associate a count of visits by users in selected intervals and associate with the navigation path between webpages after the changes are made. In one aspect, changes may include deleting and/or adding network nodes or webpages within the website and/or altering hyperlink options between network nodes or webpages within the website.

Figure 6:
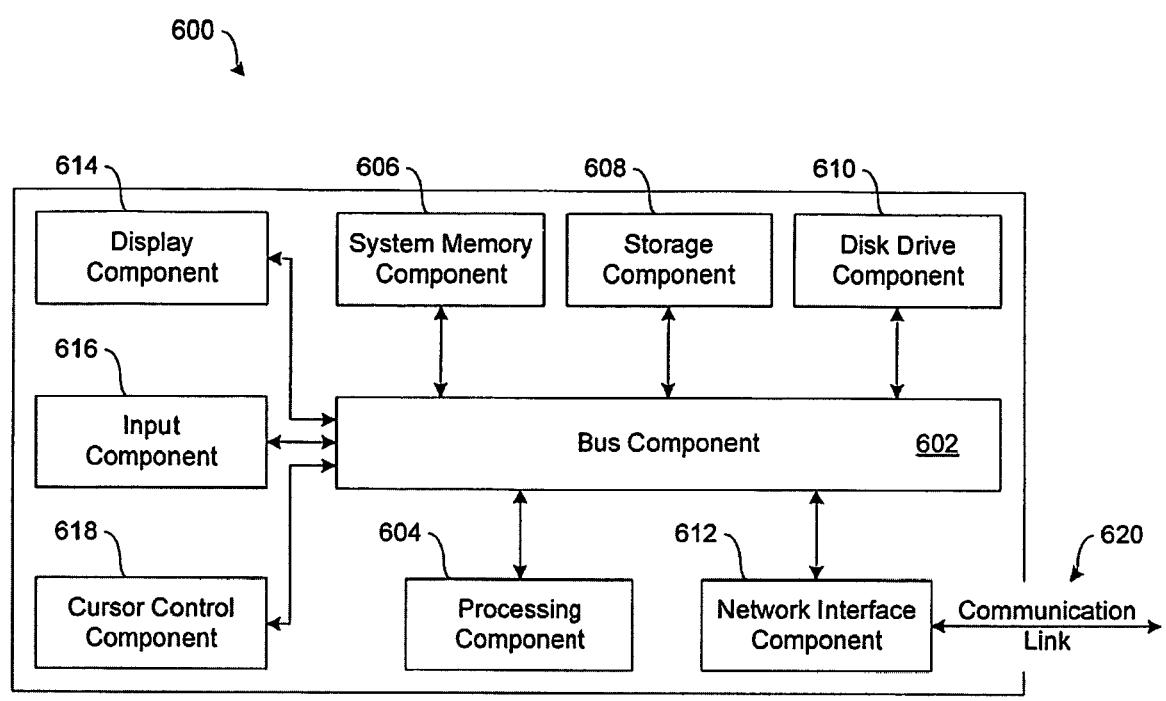
FIG. 6 is a block diagram of a computer system suitable for implementing embodiments of the present disclosure.

FIG. 6 is a block diagram of a computer system 600 suitable for implementing embodiments of the present disclosure, including the client device 120, the one or more resource provider devices 140, and the service processing device 180. In various implementations, the client device 140 may comprise a personal computing device, such as a personal computer, laptop, PDA, etc., the one or more resource provider devices 140 may comprise a network computing device, such as a server, and the service processing device 180 may comprise a network computing device, such as a server. Thus, it should be appreciated that the devices 120, 140, 180 may be implemented as computer system 600 in a manner as follows.

In accordance with various embodiments of the present disclosure, computer system 600, such as a personal computer and/or a network server, includes a bus 602 or other communication mechanism for communicating information, which interconnects subsystems and components, such as processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard), and cursor control component 618 (e.g., mouse or trackball). In one implementation, disk drive component 610 may comprise a database having one or more disk drive components.

In accordance with embodiments of the present disclosure, computer system 600 performs specific operations by processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of or in combination with software instructions to implement the present disclosure.

Logic may be encoded in a computer readable medium, which may refer to any medium that participates in providing instructions to processor 604 for execution. Such a medium may take many forms, including but not limited to, non-volatile media and/or volatile media. In various implementations, non-volatile media may include optical or magnetic disks, such as disk drive component 610, and volatile media may include dynamic memory, such as system memory component 606. In one aspect, data and information related to execution instructions may be transmitted to computer system 600 via transmission media, such as coaxial cables, copper wire, and fiber optics, including wires that comprise bus 602. In various examples, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 620 (e.g., network 160 of FIG. 1, LAN, WLAN, PTSN, or various other wired or wireless networks) may perform instruction sequences to practice the present disclosure in coordination with one another.

Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for mapping user experiences over a network, the system comprising:
   a server having a communication component for:
      communicating with a user via a client device over the network; and
   the server having a processing component for:
      tracking user navigation events of the user over the network,
      obtaining previous path data related to a plurality of previous sequences of user navigation events,
      obtaining revised path data related to a plurality of revised sequences of user navigation events,
      comparing the previous path data to the revised path data,
      identifying changes to the previous path data based on the comparison of the previous path data to the revised path data, and
      generating a map of the user navigation events based on the identified changes to the previous path data, wherein the map comprises a first path taken by the user before a node has been deleted and a second path taken by the user after the node has been deleted, wherein the first and second paths are visually distinct, wherein the deleted node is visually distinct from nodes in the revised data path, wherein changes to path data include at least one of re-routed sequences of user navigation events, deleted sequences of user navigation events, and added sequences of user navigation events, and wherein sequences of user navigation events comprises sequences of network traffic between webpages, and wherein re-routed sequences includes re-routed network traffic between webpages, deleted sequences includes re-routed sequences around deleted webpages, and added sequences includes re-routed sequences through added webpages.

2. The system of claim 1, wherein the plurality of sequences of user navigation events includes a first sequence of user navigation events and a second sequence of user navigation events that is at least different than the first sequence of user navigation events.

3. The system of claim 1, wherein the map comprises visual path data of the user navigation events.

4. The system of claim 1, wherein the processing component maintains a user sequence log that tracks the user navigation events over the network.

5. The system of claim 1, further comprising a storage component adapted to store at least one of the user navigation events over the network, the path data, the changes to the path data, and the map of the user navigation events.

6. The system of claim 1, further comprising a display component adapted to display at least one of the user navigation events over the network, the path data, the changes to the path data, and the map of the user navigation events.

7. The system of claim 1, wherein the communication component is adapted to communicate with a resource provider via a resource device over the network, and wherein the processing component is adapted to track user navigation events of the user over the network via the resource provider.

8. The system of claim 7, wherein the processing component tracks the user navigation events of the user through a network site of the resource provider.

9. The system of claim 7, wherein the resource provider comprises at least one of an information resource provider and a marketplace provider, and wherein the resource device comprises a resource server adapted to communicate with the client device and the processing component via the network.

10. The system of claim 7, wherein the client device comprises a computer adapted to communicate with the processing component and the resource device via the network.

11. The system of claim 7, wherein the client device includes a browser application adapted to allow the user to access the resource device via the network and navigate through a plurality of resource pages made available on a network site by the resource provider.

12. A method for mapping user experiences over a network, the method comprising:
at a server, obtaining previous path data related to a first sequence of user navigation events;
at the server, obtaining revised path data related to a second sequence of user navigation events that is at least different than the first sequence of user navigation events;
at the server, comparing the previous path data of the first sequence of user navigation events to the revised path data of the second sequence of user navigation events;
at the server, identifying changes to the previous path data based on the comparison of the previous path data and the revise path data; and
at the server, generating a map of the user navigation events based on the identified changes to the previous path data, wherein the map comprises a first path taken by the user before a node has been deleted and a second path taken by the user after the node has been deleted, wherein the first and second paths are visually distinct, wherein the deleted node is visually distinct from nodes in the revised data path, wherein changes to path data include at least one of re-routed sequences of user navigation events, deleted sequences of user navigation events, and added sequences of user navigation events, and wherein sequences of user navigation events comprises sequences of network traffic between webpages, and wherein re-routed sequences includes re-routed network traffic between webpages, deleted sequences includes re-routed sequences around deleted webpages, and added sequences includes re-routed sequences through added webpages.

13. The method of claim 12, further comprising:
at the server, tracking user navigation events on the network by communicating with at least one of a user via a client device over the network and a resource provider via a resource device over the network.

14. The method of claim 12, wherein obtaining path data comprises:
at the server, communicating with at least one of a user via a client device over the network and a resource provider via a resource device over the network.

15. The method of claim 12, further comprising:
at the server, maintaining a user sequence log that tracks the user navigation events including the first and second sequences of user navigation events.

16. The method of claim 12, further comprising:
at the server, storing at least one of the user navigation events over the network, the path data, the changes to the path data, and the map of the user navigation events.

17. The method of claim 12, further comprising:
at the server, displaying at least one of the user navigation events over the network, the path data, the changes to the path data, and the map of the user navigation events.

18. The method of claim 12, wherein generating the map comprises:
at the server, generating visual path data of at least one of the user navigation events over the network, the path data, the changes to the path data, and the map of the user navigation events.

19. The method of claim 12, further comprising:
at the server, communicating with a resource provider via a resource device over the network to obtain path data,
wherein the resource provider comprises at least one of an information resource provider and a marketplace provider, and
wherein the resource device comprises a resource server adapted to communicate with the client device and the second component via the network.

20. The method of claim 12, further comprising:
at the server, communicating with a user via a client device over the network,
wherein the client device comprises a computer adapted to communicate with the second component via the network.

21. The method of claim 20, wherein the client device includes a browser application adapted to allow the user to access a resource device of a resource provider via the network and navigate through a plurality of resource pages made available on a network site by the resource provider.

22. The method of claim 12, wherein the method is performed by a server adapted to map user experiences over the network.

23. A non-transitory computer readable medium on which are stored computer readable instructions and, when executed by a processor, the processor is operable to:
    obtain previous path data related to a first sequence of user navigation events;
    obtain revised path data related to a second sequence of user navigation events that is at least different than the first sequence of user navigation events;
    compare the present path data of the first sequence of user navigation events to the revised path data of the second sequences of user navigation events;
    identify changes to the previous path data based on the comparison of the previous path data and the revise path data; and
    generate a map of the user navigation events based on the identified changes to the previous path data, wherein the map comprises a first path taken by the user before a node has been deleted and a second path taken by the user after the node has been deleted, wherein the first and second paths are visually distinct, wherein the deleted node is visually distinct from nodes in the revised data path, wherein changes to path data include at least one of re-routed sequences of user navigation events, deleted sequences of user navigation events, and added sequences of user navigation events, and wherein sequences of user navigation events comprises sequences of network traffic between webpages, and wherein re-routed sequences includes re-routed network traffic between webpages, deleted sequences includes re-routed sequences around deleted webpages, and added sequences includes re-routed sequences through added webpages.

24. The non-transitory computer readable medium of claim 23, further operable to track user navigation events on the network by communicating with at least one of a user via a client device over the network and a resource provider via a resource device over the network.

25. The non-transitory computer readable medium of claim 23, further operable to communicate with at least one of a user via a client device over the network and a resource provider via a resource device over the network to obtain the present and revised path data related to the first and second sequences of user navigation events, respectively.

* * * * *